United States Patent Office

2,889,298
Patented June 2, 1959

2,889,298

ANTIFOGGING COMPOSITION FOR LENS IN GAS MASKS

William S. Brown, Falls Church, Va., assignor to the United States of America as represented by the Secretary of the Navy No Drawing. Application September 23, 1955
Serial No. 536,320

1 Claim. (Cl. 260—29.6)

(Granted under Title 35, U.S. Code (1952), sec. 266)

The invention described herein may be manufactured and used by or for the Government of the United States of America for governmental purposes without the payment of any royalties thereon or therefor.

This invention relates to compositions for preventing fogging and frosting of transparent surfaces. A principal object of the invention is the provision of an antifogging composition which will afford longer lasting clear vision through the plastic lens of gas masks than has been heretofore obtained.

Fogging of the lens of gas masks occurs through condensation of moisture from the warm humid breath of the wearer as discrete droplets on the cold inner surface of the lens. In view of the fact that adequate vision through a fogged or frosted lens is an impossibility, movement or other operations involving visual observation by the wearer of the mask is quite limited.

It has been heretofore proposed to employ antifogging preparations which depend for their efficacy upon the action of a wetting agent (surface-active agent) to prevent fogging of the surface. They are usuallly applied sparingly to the surface which is then rubbed with a soft cloth to remove any excess, leaving a film of the preparation on the surface. The wetting agent dissolves in the droplets of water on the surface and through reduction in the surface tension of the droplets causes them to coalesce to a continuous transparent film of water on the surface. A relatively water-insoluble material is usually present in the preparation to retard solution of the wetting agent in the droplets of water and thereby prolong the efiective life of the film. While this type of preparation is effective to a greater or less extent in minimizing fogging, the period of its effectiveness to provide adequate vision through the single, wide, flexible plastic lens of present day gas masks is quite short. This is because the film of water, formed on the surface by the action of the wetting agent, does not retain its initial uniformity of thickness but within a fairly short period of time becomes uneven and thereby possesses distorted optical qualities which impair vision to as great an extent as fogging. This type of preparation, in general, also, has a short effective life.

According to the present invention there is provided a new type liquid antifogging composition which, in the form of a dried film on the surface of the plastic lens of a gas mask, prevents fogging and frosting of the lens through absorption of moisture from the exhaled breath of the wearer and subsequent release of stored moisture to the less humid air brought into the mask on inspiration. A longer period of clear vision through the lens is thereby to be obtained than by the use of antifogging preparations which depend for their efficacy on a wetting agent alone.

The new liquid composition of my invention comprises a solution in water of the hygroscopic salt, lithium chloride, polyvinyl alcohol, glycerol and a suitable wetting agent. Alcohol (ethanol) is also present in the compositions in an amount up to about an equal volume with the water for the purpose of promoting rapid drying of the film on the surface of the plastic lens. The solution is applied to the inner surface of the lens of the gas mask with a soft bristle brush or by spraying and allowed to dry at room temperature.

The lithium chloride functions to increase the sensitivity of the dried film on the plastic lens to change in humidity of the atmosphere within the gas mask and causes the film to alternately gain and lose moisture in response to the change, whereby fogging of the lens is prevented. It is used in the composition in amounts of from about .09 to 2.5% by weight. The film forming material in the composition is the polyvinyl alcohol which acts a carrier for the lithium chloride in the dried film on the lens. The polyvinyl alcohol, which may also serve as an absorbent for moisture, is used in proportions of from about 1 to 10% by weight. Glycerol is used in the composition to plasticize and promote adhesion of the polyvinyl alcohol to the surface of the plastic lens, the amount used being sufficient to cause the dried film to flex with the lens and is within the range of about 1 to 5% by weight.

The wetting agent promotes adhesion of the dried film of the composition to the surface of the plastic lens through reduction in the interfacial tension between the lens surface and the polyvinyl alcohol. Selection of the wetting agent depends upon the chemical composition of the plastic constituting the lens and may be made by a simple test to determine the adhesion obtained with the use of a particular wetting agent, as will be understood by those skilled in the art. The use in the composition of, for example, the wetting agent sold under the trade name Igepon TK-42 has been found to give excellent adhesion of the dried film to the polyvinyl plastic sold under the trade name Bakelite VT-1928. Japan TK-42 is sodium tall oil methyl tauride and is principally sodium N-abietoyl-N-methyl taurate of the formula

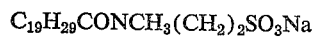

$$C_{19}H_{29}CONCH_3(CH_2)_2SO_3Na$$

Bakelite VT-1928 is a copolymer of vinyl chloride and vinyl acetate, the vinyl chloride being in predominant amount, plasticized with dioctyl phthalate. By the use of a suitable wetting agent, lens made of plasticized polystyrene or plasticized polymethyl methacrylate or of other plasticized transparent vinyl polymers can be protected against fogging by the present composition. The amount of the wetting agent employed in the composition may range from about .05 to 0.5% by weight. The wetting agent also promotes the formation of a more uniform film on the lens and thereby less optical distortion.

A preferred composition in accordance with the invention comprises by weight about 5% polyvinyl alcohol, from about 2 to 2.5% glycerol, from about 0.2 to 0.3% lithium chloride and from about 0.1 to 0.2% of the wetting agent in solution in water-alcohol solution of about 50-50 volume ratio of water to alcohol.

The composition of the invention can be prepared by adding the polyvinyl alcohol to 95% ethanol and stirring to form a suspension. An equal volume of water is then added to the suspension under stirring and the whole warmed on a water bath at about 90–95° C. until solution is effected, using a return condenser on the flask for condensation of the vapors. This operation will usually be completed within about two hours. The solution is then diluted with a water-alcohol mixture to the desired ratio of water and alcohol in the finished composition. While a preferred ratio is 50–50 by volume, lesser amounts of alcohol may be used in the composition with a somewhat slower drying rate for the eventual film on the lens. To the solution thus modified is added the other ingredients in the determined proportions and in any desired order and solution effected by stirring to produce the finished composition. The lithium chloride is preferably first put into solution in a small amount of water before adding to the water-alcohol solution of the polyvinyl alcohol, for example, .5 gram of the salt in 5 ml. of water.

The invention is further illustrated by the following specific example of a composition thereunder in which parts are by weight unless otherwise noted.

*Example*

A water-ethanol (50-50 by volume) solution of polyvinyl alcohol (5%) is prepared as described above. To 100 ml. of this solution is added 2 ml. (2.4 grams) of glycerol, 6 ml. of 5% lithium chloride water solution (0.3 grams LiCl) and 0.2 mol. (0.2 gram) of Igepon TK-42, accompanied by stirring to form the finished solution. The composition of this antifogging preparation by weight of the ingredient, excepting the water and alcohol, is:

| | Percent |
|---|---|
| Polyvinyl alcohol | 4.62 |
| Glycerol | 2.22 |
| Lithium chloride | 0.227 |
| Wetting agent | 0.185 |
| Water-alcohol | Balance |

A solution having the above composition was tested at 32° F. and 92 to 100% humidity on the inner surface of the lens of a standard gas mask. The lens of the mask was .06 inch thick and made of the polyvinyl plastic, Bakelite VT-1928, and the mask worn in a cold chamber. The vision test was the ability of the person to read letters on a standard sight testing chart, A.M.A. Rating Direct Reading; from a predetermined distance at three minute intervals over a fifteen minute period. The chart lines to be read during the test ranged from line 1 (letter height 9 mm.) through line 9 (letter height 35 mm.). The number of the chart line read indicated the degree of vision at the end of a given time interval. At a distance of five feet from the chart and at 32° F. and 92 to 100% humidity, no difficulty was experienced reading line 1 (the smallest letter height) at the end of 15 minutes' wearing of the mask. At a distance of ten feet from the chart and at 0° F. and 90 to 100% humidity, line 2 was readable without error at the 15 minute interval. No fogging was experienced in either instance. The results were unexpected, since the high relative humidity of the atmosphere prevented the loss of water from the film when air was drawn into the mask.

The antifogging composition of the invention is more effective at the lower humidities to be encountered under normal atmospheric conditions. The dried film from the composition is transparent, has good optical qualities, and long effective life under conditions of low temperature and high relative humidity of the surrounding atmosphere. It is sufficiently flexible to adhere to flexible plastic surfaces.

While I have described herein a preferred embodiment of the invention, it is obvious that the principle of the invention may be variously embodied without departing from the spirit or scope thereof.

What is claimed is:

A liquid antifogging composition consisting essentially of a solution in water-ethyl alcohol mixture containing about equal volumes of water and ethyl alcohol of, by weight, about 5% polyvinyl alcohol, from about 2 to 2.5% glycerol, from about 0.2 to 0.3% lithium chloride and from about 0.1 to 0.2% sodium tall oil methyl tauride.

References Cited in the file of this patent
UNITED STATES PATENTS

| | | |
|---|---|---|
| 1,556,714 | Ridgely | Oct. 13, 1925 |
| 2,246,915 | Dangelmajer | June 24, 1941 |
| 2,372,982 | Richards et al. | Apr. 3, 1945 |
| 2,449,812 | Hervey | Sept. 21, 1948 |
| 2,622,044 | Martens | Dec. 16, 1952 |
| 2,676,121 | Chapman | Apr. 20, 1954 |
| 2,731,353 | Fain et al. | Jan. 17, 1956 |

FOREIGN PATENTS

| | | |
|---|---|---|
| 121,624 | Australia | June 24, 1946 |